Figure 1:
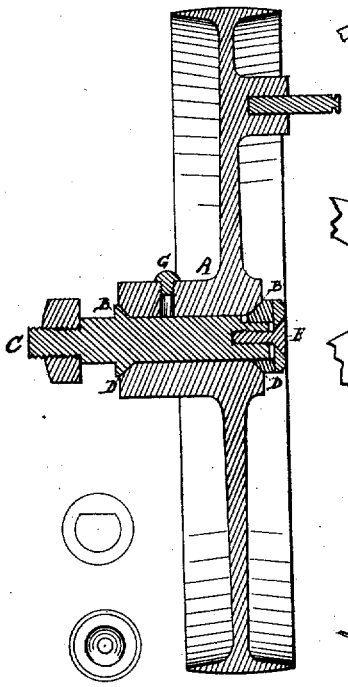

F. W. WILD.

BALANCE-WHEEL.

No. 7,114. Reissued May 16, 1876.

WITNESSES

Parker H. Sweet Jr.

Joseph Shinn.

By

INVENTOR

Frederic W. Wild

J. E. Dore Jr

Attorney

N. PETERS, PHOTO-LITHOGRAPHER, WASHINGTON, D. C.

UNITED STATES PATENT OFFICE.

FREDERICK W. WILD, OF BALTIMORE, MARYLAND, ASSIGNOR TO THE DOMESTIC SEWING MACHINE COMPANY.

IMPROVEMENT IN BALANCE-WHEELS.

Specification forming part of Letters Patent No. 114,240, dated April 25, 1871; reissue No. 7,114, dated May 16, 1876; application filed April 20, 1875.

*To all whom it may concern:*

Be it known that I, FREDERICK W. WILD, of the city of Baltimore, in the State of Maryland, have invented new and useful Improvements in Journal-Studs for Sewing-Machines; and I do hereby declare that the following specification, taken in connection with the drawings furnished, is a full, clear, and exact description thereof, which will enable others skilled in the art to make and use the same.

Prior to my application journals of apparent similarity of construction were known, although inadequate for the purpose of ready adjustment to machines or stands, or to form the bearings requisite for journals. Formerly balance-wheels or pulleys were either secured upon a shaft, and the latter supported at or near each end, or upon a short pin with a limited bearing, straight in form, generally attached to and projecting from the leg of the machine; and in order to secure a proper fit, to insure as much lasting wear to the engaging parts as possible, much care and caution became necessary to be applied in their construction, and even with the best of attention to these parts they soon become worn without adequate means within themselves for compensating for such wear, consequently, would wabble and jar and rotate very irregularly, to the detriment of the operator and to the proper operations of the machine, such wear resulting principally from the unequal strain of the pitman upon the crank-pin in passing the center, causing the hub to rapidly wear at each entrance of the opening, "flaring" in form or as it is sometimes termed "bell-mouthed," so that the oil that should be present for lubrication escapes without restraint.

It is also a well-known fact that these difficulties involve frequent and expensive repairs, which many, in fact a large number of, families and owners cannot easily or well afford.

The object of my said improvement is to obviate these objections and difficulties; to insure a more ready and effective mode of fitting the bearing-surfaces of the engaging parts; the embodiment of features, adapted to be adjusted by unskilled labor, constructed in a manner to admit of adjustment when the least wear to the bearing-surfaces becomes apparent; and, finally, affording means for retaining the lubricating medium in the desired position without the usual liability to waste. And to that end I have formed a journal with a stem suitable for forming a ready connection with a machine stand or table, to which the same is intended to be applied. The projecting part, which is intended more particularly to support and suspend the balance wheel or pulley, is provided with two cones, B B, which form the bearings upon which the pulley revolves. One of these cones is adapted to be, and is, longitudinally adjustable with relation to the other, and may be moved in the desired direction to compensate for the wear that occurs to the bearing-surfaces in practice, which adjustment is accomplished by means of a screw-thread, with which the stud is provided, and a corresponding counterpart. An effective arrangement for the purpose is represented in Fig. 1 of the drawings.

Figure 2:
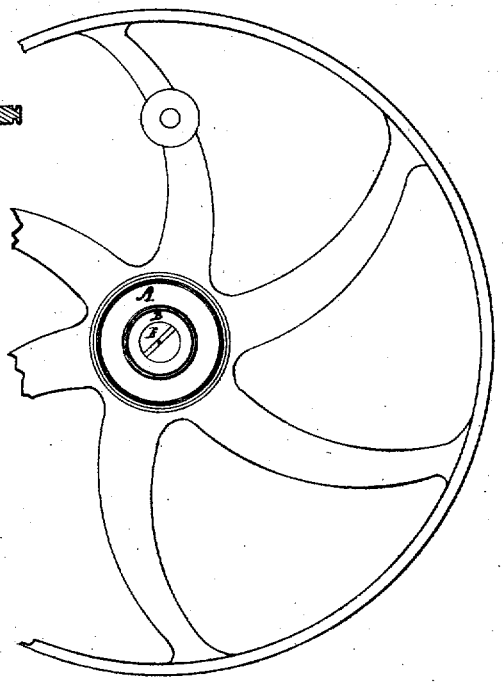
Figure 3:
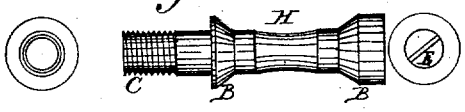
Figure 4:
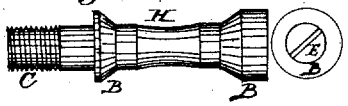
Figure 5:
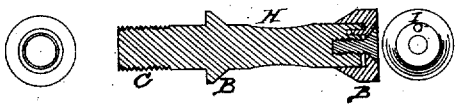
Figure 6:
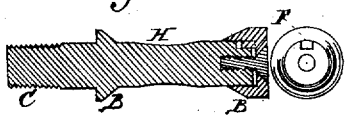

The illustrations in the drawings are the following:

Figure 1, section of stud and pulley; Fig. 2, side view; Figs. 3 and 4, studs; Figs. 5 and 6, sections of 3 and 4.

A, hub of a pulley; B B, conical journals; C, stem; D D, recesses; E, screw-thread; G, thumb-screw; H, space forming an oil-chamber.

Upon reference to the drawings, which form a part of this specification, it will be seen that my improved journal-stud is provided with two cones, B B, which form the journal-bearings for the pulley, and a stem, C, for connection with the machine or stand for which it is intended. One of these cones is represented as fixed and the other movable, which latter is kept from revolving by pin I, or other means, substantially the same as represented in the modifications shown in the drawings, and is adapted to be advanced or retracted through the medium of a screw-thread with which the stud is provided, which has been hereinbefore more definitely referred to. The pulley with which the journal-stud is connected is represented with two conical-shaped recesses, D D, one at each end of the hub, forming a counterpart to the male cones, which form the bearing-surfaces.

Thus it will be seen that when, by wear, the least lost motion is apparent the movable cone may be advanced toward the other through the medium of the screw-thread until the wheel moves again smoothly and regularly.

By this construction of the hub and pin or stud the oil will not leak out, but will be present for lubricating the hub and pin only. The hub is constructed with an oil-hole and a thumb-screw, G, which screw is fitted so as to prevent the oil from being exhausted from the hub and pin by centrifugal force.

Modifications of my improvements are represented in detached parts, with the stud hollowed out for the purpose of forming a larger chamber for retaining oil, if in practice found necessary. And the end sought by said invention is to render the sewing-machine less liable to get out of order, less expensive to keep in good repair, more harmonious in its action, less noisy, and more agreeable to operate.

I am aware that washers having a slightly-tapered face have been employed in connection with the skeins of carriage-axles for retaining the oil in position, prior to my patent. Therefore, I do not claim, broadly, conical surfaces, neither do I claim journal-studs, broadly; but, Having set forth the construction and arrangement of the various parts which form my said improvement, I claim—

1. As an improved article of manufacture, the herein-described journal-stud, provided with a stem threaded at its extremity, adapted for ready connection with a machine or stand, said journal-stud having two conical bearing-surfaces, one of which is adjustably related to the other, substantially as and for the purposes set forth.

2. The combination, with a balance-wheel or pulley, provided with a recessed hub, of a journal-stud, provided with a stem and conical bearings, one of which is adjustable with relation to the other, substantially as and for the purposes set forth.

In testimony that I claim the foregoing I have hereunto subscribed my name before two subscribing witnesses on this 28th day of January, A. D. 1875.

FRED. W. WILD.

Witnesses:
JOHN DANE, Jr.,
PARKER H. SWEET, Jr.